United States Patent

Johnson et al.

[15] 3,696,666
[45] Oct. 10, 1972

[54] DUST LEAK DETECTOR FOR AIR CLEANER SYSTEMS

[72] Inventors: Lemoine L. Johnson; William P. Timmons, both of Minneapolis, Minn.

[73] Assignee: Donaldson Company, Inc., Minneapolis, Minn.

[22] Filed: Oct. 15, 1969

[21] Appl. No.: 870,458

[52] U.S. Cl. .............. 73/118, 73/28, 73/38, 340/239 F
[51] Int. Cl. ............................................. G01m 15/06
[58] Field of Search ...... 73/28, 38, 196, 202, 118, 61; 55/274; 340/239

[56] References Cited

UNITED STATES PATENTS

| 984,047 | 2/1911 | Touzalin................73/28 |
| 2,790,320 | 4/1957 | Salko et al. ...........73/196 X |
| 2,901,626 | 8/1959 | Becker..............73/421.5 UX |
| 3,033,030 | 5/1962 | Heller.......................73/118 |
| 3,258,960 | 7/1966 | Baden et al................73/118 |
| 3,352,197 | 11/1967 | Porges et al. .........73/61 R UX |

FOREIGN PATENTS OR APPLICATIONS 158,137 1/1964 U.S.S.R. .....................73/28

*Primary Examiner*—Charles A. Ruehl
*Attorney*—Merchant & Gould

[57] ABSTRACT

Apparatus and method is disclosed for continuously sampling, at a point downstream of the air cleaner, the normally clean air entering an engine to produce a signal indicating the cleanliness of the total air stream entering the engine. A sample of the air is continuously circulated through a small detector filter and the resistance of the filter to air flow is continuously monitored. In case of dust leakage, the resistance of the detector filter increases very rapidly because of increased dust loading, giving an immediate indication of the abnormal condition.

11 Claims, 9 Drawing Figures

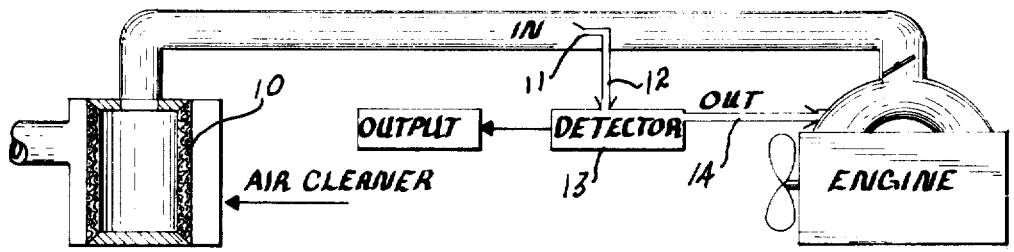
Fig. 1 CARBURETED ENGINES
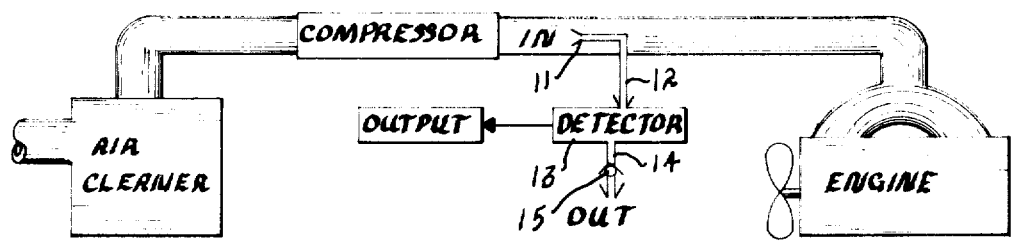
Fig. 2 TURBO-CHARGED OR SUPER CHARGED ENGINES
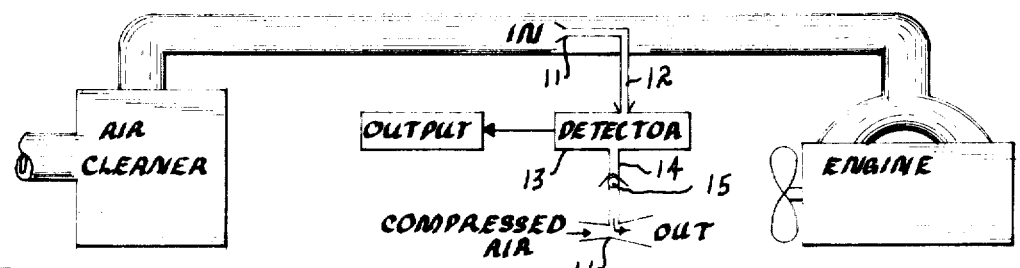
Fig. 3 NATURALLY-ASPIRATED ENGINES
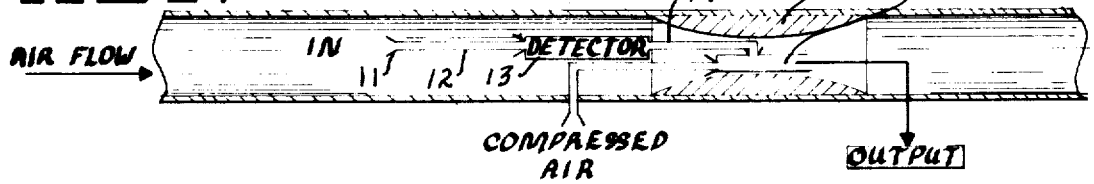
Fig. 4
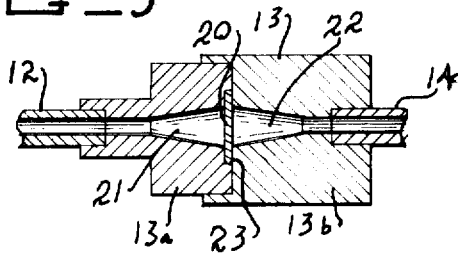
Fig. 5
INVENTOR.
LEMOINE L. JOHNSON
WILLIAM P. TIMMONS
BY
Merchant & Gould
ATTORNEYS

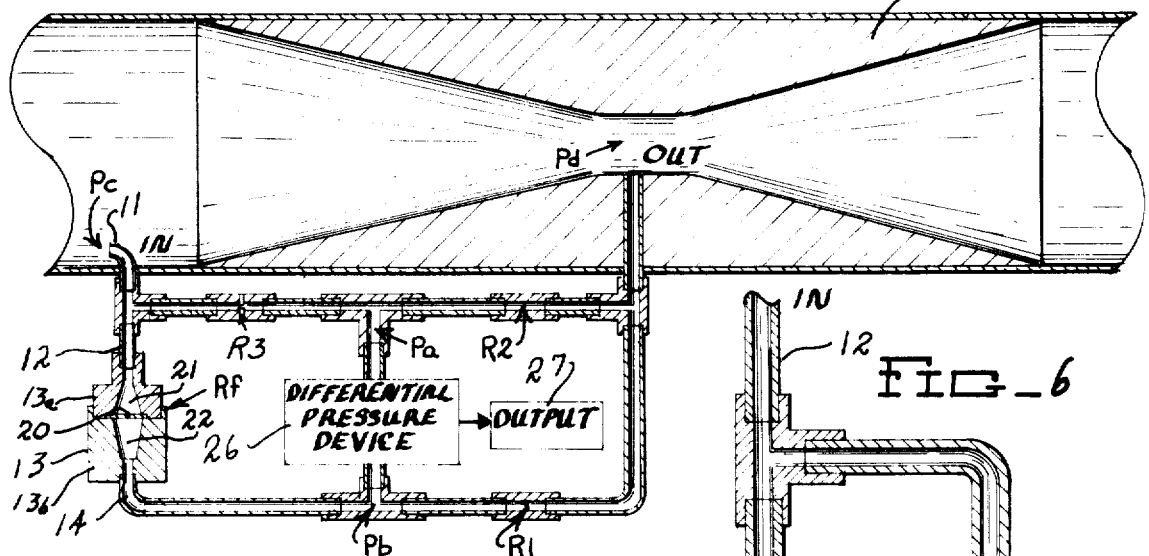
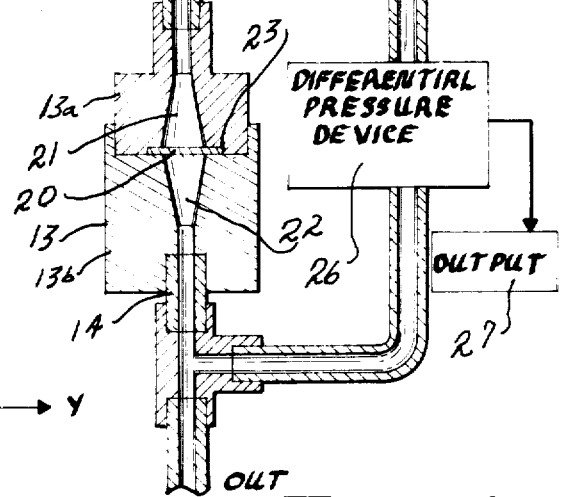
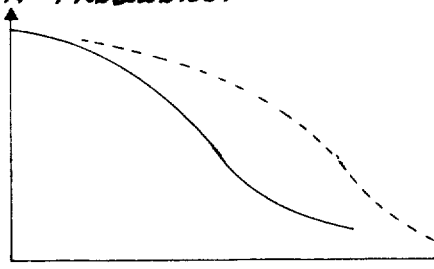
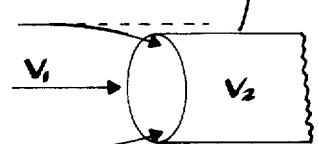
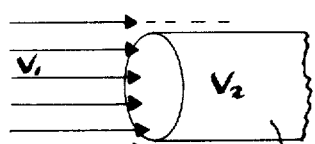
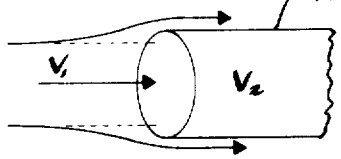
INVENTOR.
LEMOINE L. JOHNSON
WILLIAM P. TIMMONS
BY
Merchant & Gould
ATTORNEYS

DUST LEAK DETECTOR FOR AIR CLEANER SYSTEMS

BACKGROUND OF THE INVENTION

1. Field of the Invention

This invention relates generally to systems for monitoring the operation of air cleaners and more particularly relates to a system for detecting abnormal amounts of dust in the air downstream from an air cleaner as an indication of leakage at some point in the clean air flow path.

2. Description of the Prior Art

Present day engines operating in dust contaminated environments require a continuous supply of clean air to avoid excessive engine wear and deterioration. Current practice is to provide highly efficient air cleaner systems to remove dust and other contaminants which otherwise would enter the engine via the intake air. These systems typically remove 99.99 percent of a standard test dust such as AC Coarse Test Dust for all ambient concentrations.

While present air cleaner systems provide adequate engine protection under almost all operating conditions, there is an inherent danger of excessive engine wear in the event of either a fracture in the filter element media or a leak in the intake duct work between the air cleaner and the engine. Further, improper assembly of the filter element within the air cleaner can produce the same effects. When such events occur, there is usually no warning that the dust leak goes unnoticed until severe engine wear or even failure has resulted.

In order to protect against the effects of dust leaks occurring within the air cleaner itself, for example a fractured element or an element improperly installed, some air cleaner designs incorporate a secondary or safety element. The safety element is simply another barrier-type filter which operates in series with the primary element. These safety elements have the disadvantage of increasing the air cleaner cost and size. Moreover, safety elements are also subject to failure or improper installation and do not protect against dust leaks occurring between the air cleaner assembly and the engine.

SUMMARY OF THE INVENTION

The present invention provides a means of detecting dust leaks occurring in an air cleaner or in the duct work leading to the engine. It also provides a warning signal such that the dust leak may be corrected before significant engine damage occurs. The present invention provides apparatus and method for continuously sampling the intake air stream at a point downstream of the air cleaner and for producing a continuous signal which indicates the cleanliness of the total air stream entering the engine.

A sample of the intake air stream is continuously circulated through a detector consisting of a small piece of suitable filter medium. Under normal operating conditions with no dust leaks in the system, the resistance to flow offered by the filter detector will remain relatively constant. There will only be a small change in resistance because only very small particles of dust are present downstream from the air cleaner and also because most of the fraction of dust that passes the primary filter will also pass the detector filter. During conditions of a dust leak, however, substantially larger dust particles will be present in the intake air stream. In this situation, the resistance of the detector element will change very rapidly because of the increased dust loading on the detector element. This change in resistance can be measured directly in terms of pressure drop change across the detector element. Depending upon the method of providing the sampling flow, and particularly upon the total pressure drop or potential across the sampling circuit, the change in resistance across the detector element can result in output pressure drop signals of several inches of water. In general, the maximum output pressure drop signal that can be derived is limited to the pressure drop across the sampling circuit. This would correspond to a condition where the detector element is completely plugged because of the dust leak.

By using the present invention, excessive engine wear or failure caused by physical damage to the air cleaner system, can be avoided. Out invention is simple and inexpensive to install and the detector element can be serviced at the same time the air cleaner itself is serviced. These and other advantages of the present invention will be more fully described in the following specification.

BRIEF DESCRIPTION OF THE DRAWINGS

FIG. 1 is a schematic diagram of the detector system as applied to carbureted engines;

FIG. 2 is a schematic diagram of the detector system as applied to turbo-charged or super-charged engines;

FIG. 3 is a schematic diagram of the detector system as applied to naturally aspirated engines;

FIG. 4 is a schematic diagram of the detector system with a turbulence amplifier providing the output signal;

FIG. 5 is a sectional view of a detector filter and the mounting assembly therefor;

FIG. 6 discloses schematically the use of a differential pressure switch to measure the resistance of the detector filter;

FIG. 7 is a schematic diagram showing the use of a pneumatic bridge circuit to measure the resistance of the detector filter;

FIG. 8 is a graph showing particle size frequency versus particle size under normal and abnormal intake air conditions; and FIG. 9 is a series of three schematic diagrams showing the effect of air velocities in the duct and in the probe upon larger dust particles.

DESCRIPTION OF THE PREFERRED EMBODIMENTS

FIGS. 1, 2 and 3 show schematically the application of the present invention to three different types of engines. In each case, the engine is provided with an air cleaner and with suitable duct work leading from the air cleaner to the engine. As shown schematically in FIG. 1, the air cleaner may comprise a cylindrical filter element 10 through which the air is drawn. The filter element can be constructed from a fibrous medium, pleated or otherwise, according to any present well known practice. The air cleaner could also comprise an inertial precleaner and a filter element in series therewith. An oil bath air cleaner might also be used. The present invention is not concerned with the type of air filter or cleaner that is used, so long as it provides a normally clean flow of air through the duct work leading to the engine.

As shown schematically in FIG. 1, the sampling circuit includes a probe 11 mounted in the air duct, inlet tubing 12 connected between the probe 11 and the detector 13, and outlet tubing 14 connected between the detector 13 and the intake manifold of the engine. With this arrangement of components in a carbureted engine, the potential or pressure drop across the sampling circuit is approximately equal to the intake manifold depression. This potential or pressure drop causes a suitable amount of "clean" air from the air duct to be drawn or circulated continuously through the detector 13. If the filter 10 is damaged or improperly installed, abnormal amounts of dust or dirt may pass through the air cleaner into the duct work leading to the engine. A portion of this abnormally dirty air will be drawn into the probe 11 and through the detector 13. When this occurs, a suitable output signal will be provided in a manner later to be described.

FIG. 2 discloses the same type of detector system as applied to a turbo-charged or super-charged engine. In applications such as this, involving intake air at pressures above atmospheric pressure, the sampling circuit can be installed on the high pressure side of the compressor. The sample flow may then be passed through the detector 13 and discharged to atmosphere through a check valve 15 to prevent reverse flow through the detector.

In naturally aspirated engines, as shown in FIG. 3, there is not a convenient potential or pressure drop source to provide sampling flow. In these applications the required sampling flow can be induced by means of an ejector 16 that can be powered by either a compressed air source or exhaust gas energy. Again, a difference in pressure between the probe 11 and the throat of the aspirator 16 provides the sampling flow through the detector 13.

FIGS. 4 and 7 disclose another approach to providing sampling flow potential in any closed air flow system. This method involves creating a change in static pressure between two stations in the air duct by means of varying the velocity of the air. An efficient and practical way to accomplish this velocity change in the air duct is by means of a venturi 17 installed in the air duct. The probe 11 is positioned upstream from the narrow throat portion of the venturi 17. Static pressure will always be lower at the throat portion of the venturi than at the probe entrance. Therefore, there will always be flow into the probe, through the detector and back to the primary flow at the throat of the venturi. As indicated above, a venturi can be installed in any closed air flow system to provide a pressure difference to establish air flow through the detector.

The construction of the detector 13 is shown in FIG. 5. Detector 13 comprises a pair of housing portions 13a and 13b and a small filter element 20. Housing portion 13b is provided at one end with a cavity into which housing portion 13a snugly interfits. The two housing portions can be held together by a friction fit or suitable mating threads can be provided. Both of the housing portions 13a and 13b are provided with axial air passages 21 and 22 respectively, that are aligned with each other when the unit is assembled. Air passages 21 and 22 increase in diameter toward the center of the assembled unit to form frusto-conical shaped chambers on opposite sides of the filter element 20. The outermost ends of the axial passages 21 and 22 are connected to the inlet and outlet tubing 12 and 14 respectively.

In the preferred embodiment of our invention, the filter element 20 is circular in shape and is positioned in a small circular cavity 23 formed in the end wall of the small housing portion 13a, coaxial with passage 21. When the unit is assembled, the edges of filter member 23 are gripped tightly between the two housing portions 13a and 13b so that the center portion of the filter member 20 extends across the axial passageway 21–22. Therefore, all air passing through the detector 13 must pass through the filter member 20.

The detector filter 20 can be a single flat sheet of filter medium approximately 1 inch in diameter. The exact size will depend upon the type of material, the sampling flow rate, total pressure drop across the sampling circuit, and characteristics of the output or signal component. It is necessary that the detector filter 20 be of appropriate size to insure proper sensitivity to dust loading. Further, the filter medium must be selected such that the normally clean air flowing through the sampling circuit will not too rapidly change the fluid resistance of the detector filter 20 with dirt and dust. The detector filter should be sized and constructed from a material such that it can be cleaned or replaced at the same time the primary air cleaner is serviced.

Again, the purpose of the detector is to continuously monitor a sample of the normally clean air to detect the presence of abnormal amounts of dirt or dust. When an abnormal condition occurs, the larger dust particles will be filtered out of the sampling stream by the detector filter 20. Because of the relatively small size of the detector filter 20, the build-up of dirt thereon will quickly increase its resistance to air flow. This increase in resistance to air flow of the detector filter 20 is the parameter or variable that must be monitored to provide a suitable output signal from the system. The output device must be designed such that it is sensitive to the pressure drop which is produced during abnormal leak conditions, but the relatively smaller changes in pressure drop across the filter element that occur during normal operation must not produce the warning signal.

One type of output device is shown in FIG. 4. The sensing device can be a turbulence amplifier 25, with the sampling flow through the detector 13 being used as a control input to the turbulence amplifier. With a clean air stream, there will be no significant change in the resistance of detector 13 so that a control flow from outlet tubing 14 will be continuously present as a control input to the turbulence amplifier. Under these conditions there will be no signal to the output device from the turbulence amplifier. When a dust leak occurs, the detector cell resistance will increase, reducing the control flow to the turbulence amplifier. When the control flow is sufficiently reduced, the turbulence amplifier will produce a signal to the output device. The details of the turbulence amplifier are not shown because devices of this kind are commercially available.

Another method of monitoring the pressure drop across the detector 13 is shown in FIG. 6. A differential pressure switch 26 is connected by suitable tubing to the inlet tubing 12 and the outlet tubing 14 as shown. Differential pressure switch 26 thus continuously monitors the pressure difference between the inlet and outlet of detector 13. Differential pressure switch 26 is set so that the normal pressure drop across the detector 13 is below the switching point all during the normal service life of the air cleaner system. Thus, normal changes in the resistance of detector unit 13 will not cause the operation of switch 26. The switching point will be reached only if a dust leak occurs causing a significant increase in the resistance of detector element 20. A suitable output device 27 is provided to give a warning signal when switching occurs. Output device 27 can be a light, buzzer or other signal device.

Another approach to measuring the change in resistance of detector 13 is shown in FIG. 7. First of all, probe 11 is mounted in the air duct upstream of a venturi 17 into the throat of which is connected the outlet tubing from the detector circuit, to provide the necessary air flow therethrough. In this approach, the detector 13 is mounted in a pneumatic bridge circuit, forming a part of one leg thereof. The bridge circuit has a first leg comprising a pair of known fluid resistor means R2 and R3, and a second leg comprising the detector 13 (Rf) and another known fluid resistor R1. A differential pressure device 26 is connected between the center of the first leg, monitoring a static pressure Pa, and the center of the second leg, monitoring a static pressure Pb. The total pressure in the duct surrounding probe 11 is indicated as Pc, and the static pressure in the throat of the venturi 17, at the outlet of the detector circuit, is indicated as Pd.

Flow resistances R1, R2 and R3 are of a fixed type, either orifices of small diameter sections or tubing. In the preferred embodiment of our invention, the known fluid resistors R1, R2 and R3 are capillary tubes. For capillary tubes, the fluid resistance R equals the pressure drop across the tube ($\Delta P$) divided by the flow rate (Q) and is constant for all Reynolds numbers below 2,000. This equation can be written $R = \Delta P/Q$. For a given resistance and capillary tube diameter the length of the tube can be determined.

The initial or normal detector resistance is chosen so that the bridge circuit is biased in the preferred direction. This will produce a pressure drop potential across the differential pressure device 26. Under all normal operating conditions, the bias will remain in this preferred direction because the detector resistance will remain essentially constant. As previously indicated, the resistance of detector 13 remains essentially constant for the service life of the air cleaner. However, under conditions for dust leak and increasing resistance of the detector 13, the bridge circuit will shift through the balance or null point and establish a pressure drop bias in the opposite direction. This change in the bias direction produces the necessary signal to the output device 27.

In the preferred embodiment of our invention, the bridge is constructed so that the low pressure is initially in the known resistor leg (R2–R3) rather than the leg with the filter element. This is accomplished by properly sizing the fixed resistances. Preferably, the switching point of the bridge is set for the null or balance point of the bridge circuit where Pa equals Pb. Under normal conditions, Pb is greater than Pa.

For any given system, the initial pressure difference between Pc and Pd will be known. The initial amount of detector resistance at a given flow rate will also be known. The resistances R1, R2 and R3 are then selected to obtain the proper flow rate through the legs of the bridge circuit while obtaining a suitable pressure difference between Pa and Pb. Again, under normal flow conditions, Pb should be greater than Pa. If the switching point is then set for the null point of the bridge circuit, the detector is made insensitive to flow rate in the main duct. The detector can be made insensitive to flow rate in the main duct in this manner because, even though the difference between Pc and Pd may change radically with changes in air flow in the main duct, the balance point of the bridge is always reached when the ratio of Rf/R1 equals r3/r2. If the switching point is set for other than the balance point of the bridge, the selected difference between Pa and Pb may occur at different dust loading on detector 13, depending upon the flow rate through the main duct.

The following is an example of actual flow rates and pressure drops in a bridge circuit we have built and tested. The designation Q1 refers to the flow rate in the R1–Rf leg of the bridge, while the designation Q2 refers to the flow rate in the fixed or R2–R3 leg of the bridge.

| | |
|---|---|
| R1 = 107.7 " H20/CFM | R2 = 173 " H20/CFM |
| R3 = 227 " H20/CFM | Rf = 50 " H20/CFM |
| Q1 = .05 CFM | Q2 = .02 CFM |
| Pb – Pa = 2 " H20 | Pc – Pd = 8 " H20 |

In the above example, differential pressure device 26 would be set to provide an output signal 27 when Pb minus Pa equals zero. Again, this occurs when the ratio Rf/R1 equals R3/R2. By changing these variables, the required amount of dirt fed into the main duct that will change Pb minus Pa to a zero value required for switching can be changed. For examples, if more air flow through the detector 13 is provided, it will load up faster when dirt is present. A change in the flow rate would require changes in the other variables as well. The sensitivity of the bridge circuit for any given detector 13 and flow rate therethrough can be changed by changing the fixed resistances to provide a different normal pressure difference between Pa and Pb. Generally speaking, the greater normal difference between Pa and Pb, the more dirt loading will be required to cause the bridge circuit to reach the null point.

A preferred sampling technique has also been devised that will reduce the possibility of producing a spurious warning signal. After the filtration process is completed, the air stream normally contains a certain number of particles that have passed through the filtration system. For any given filtration system, these particles will have a size distribution that can be graphically portrayed. A graph for a typical system is shown in FIG. 8. The solid line of the graph is a plot of particle size frequency versus particle size under normal air flow conditions. It can be seen that relatively large numbers of smaller particles are present but that relatively few larger particles are present. An abnormal condition, when a dust leak is present, is shown by the dashed line. It can be seen that the particle size distribution is changed and that there are greater numbers of larger particles. Therefore, in order to recognize this abnormal situation, the detector system should discriminate in favor of recognizing increased numbers of the larger particles. The basic function of the dust leak detector is to recognize this condition of abnormal particle size distribution, and signal when this condition occurs.

As shown in FIG. 9, the detector system can be biased toward recognizing the larger or "abnormal" particles. Referring to FiG. 9, the probe 11 is shown under three different conditions of air stream velocity. In FIG. 9(a) the velocity of the air stream through the probe is greater than the velocity of the air stream in the duct surrounding the probe. In FIG. 9(b) the two velocities are equal. In FIG. 9(c) the air velocity in the duct is greater than the velocity of the air passing through the probe. Most "normal" sized particles will follow the stream lines, shown as arrows in fIG. 9. On the other hand, the larger or "abnormal" particles because of their greater momentum, will continue along their normal path. Therefore, the condition shown in FIG. 9(c) is used in leak detection because many of the normal sized particles will follow the stream lines around the probe while the heavier particles follow their normal path into the probe. The condition of FIG. 9(c) is obtained by limiting the air flow through the probe to less than the air flow that would pass through an area equal to that of the probe's inlet at the given stream velocity. By using the condition of FIG. 9(c), the detector will be responsive to an abnormal particle size distribution and will be relatively less responsive to the "normal" size distribution. Thus, the possibility of producing a spurious warning signal is reduced by using the sampling condition shown in FIG. 9(c).

The present invention is applicable to all types of engines and can be installed in existing systems without increasing the size or configuration of the intake design. The system imposes no significant additional intake loss on the engine. If the detector system is installed just ahead of the engine, it will protect against all intake leaks and not just those occurring in the air cleaner itself. The system continuously monitors the air stream and provides a warning signal shortly after a dust leak occurs, preferably at a location remote from the air cleaner itself and in view of the engine operator. Use of the present invention will eliminate the need for safety elements and will eliminate costly engine failures caused by element fractures or other dust leaks.

What is claimed is:

1. Apparatus for detecting abnormal amounts of foreign material in the air downstream from an air cleaner, comprising:
   a. separate air filter means;
   b. circuit means for circulating a portion of the air downstream from the air cleaner through said separate air filter means; and
   c. monitoring means for monitoring the resistance to air flow of said separate air filter means.

2. The apparatus of claim 1 wherein said circuit means comprises a probe mounted in an air duct downstream from said air cleaner, inlet tubing connected between said probe and said separate air filter means, and outlet tubing connected between said separate air filter means and a region of air pressure lower than the air pressure in said air duct, to circulate said portion of air through said separate air filter means.

3. The apparatus of claim 2 including a venturi having a throat portion, a source of air under pressure for passage therethrough, said throat portion providing said region of lower air pressure, said outlet tubing being connected to said throat portion.

4. The apparatus of claim 2 wherein the elements thereof are sized such that the velocity of the air portion passing through said probe is less than the velocity of the air passing through said air duct in the vicinity of said probe.

5. The apparatus of claim 1 wherein said monitoring means comprises differential pressure sensing means connected across said separate air filter means, and means responsive to said differential pressure sensing means for providing an output signal indicative of the pressure drop across said separate air filter means.

6. The apparatus of claim 1 wherein said monitoring means comprises a pneumatic bridge circuit having said separate air filter means forming a part of one leg thereof, and pressure responsive means mounted across said bridge circuit responsive to a predetermined change in the balance thereof.

7. The apparatus of claim 6 wherein said bridge circuit has a first leg comprising a pair of known resistor means and a second leg comprising said separate air filter means and another known resistor means, said pressure responsive means being connected between the center of said first leg and the center of said second leg.

8. The apparatus of claim 7 wherein said bridge circuit is sized so that under normal conditions the pressure at the center of said first leg is lower than the pressure at the center of said second leg.

9. Apparatus for detecting abnormal amounts of dust in the normally clean air entering an engine through an air duct connecting an air cleaner and the air intake of said engine, comprising:
   a. a small detector filter having a service life under normal clean air flow conditions of at least as long as that of the air cleaner;
   b. means including a probe mounted in the air duct for continuously circulating a sample of the air therein through said detector filter; and
   c. means for indicating a predetermined rise in the pressure drop across said detector filter.

10. The apparatus of claim 9 wherein the elements thereof are sized such that the velocity of the air sample passing through said probe is less than the velocity of the air passing through said air duct in the vicinity of said probe.

11. A method of detecting abnormal amounts of dust in the normally clean air downstream from an air cleaner, comprising the steps of:
   a. continuously circulating a portion of said normally clean air through a detector filter; and
   b. monitoring the resistance to air flow of said detector filter to detect an abnormal increase in said resistance as an indication of abnormal amounts of dust in the air.

* * * * *